United States Patent
Suh et al.

(10) Patent No.: US 9,798,871 B2
(45) Date of Patent: Oct. 24, 2017

(54) METHOD AND APPARATUS FOR AUTHENTICATING USER

(71) Applicant: Samsung Electronics Co., Ltd., Suwon-si, Gyeonggi-do (KR)

(72) Inventors: Sungjoo Suh, Seoul (KR); Chang Kyu Choi, Seongnam-si (KR); Jae-Joon Han, Seoul (KR)

(73) Assignee: SAMSUNG ELECTRONICS CO., LTD., Gyeonggi-do (KR)

( * ) Notice: Subject to any disclaimer, the term of this patent is extended or adjusted under 35 U.S.C. 154(b) by 4 days.

(21) Appl. No.: 14/966,012

(22) Filed: Dec. 11, 2015

(65) Prior Publication Data

US 2016/0203305 A1   Jul. 14, 2016

(30) Foreign Application Priority Data

Jan. 13, 2015  (KR) .......................... 10-2015-0005971

(51) Int. Cl.
*G06K 9/00* (2006.01)
*G06F 21/32* (2013.01)

(52) U.S. Cl.
CPC .......... *G06F 21/32* (2013.01); *G06K 9/00281* (2013.01); *G06K 9/00288* (2013.01); *G06F 2221/2129* (2013.01)

(58) Field of Classification Search
CPC ............. G06F 21/32; G06F 2221/2129; G06K 9/00228; G06K 9/00281; G06K 9/00288
See application file for complete search history.

(56) References Cited

U.S. PATENT DOCUMENTS

| | | | | |
|---|---|---|---|---|
| 7,092,555 B2* | 8/2006 | Lee | ..................... | G06K 9/00288 382/118 |
| 7,366,329 B2* | 4/2008 | Ono | ..................... | G07C 9/00158 382/115 |
| 7,693,308 B2* | 4/2010 | Ono | ..................... | G06K 9/00255 340/5.2 |
| 7,881,524 B2* | 2/2011 | Matsugu | ............ | G06K 9/00362 382/115 |
| 8,194,938 B2* | 6/2012 | Wechsler | ........... | G06K 9/00288 382/118 |
| 8,249,313 B2* | 8/2012 | Yanagi | ............... | G06K 9/00288 382/118 |
| 8,275,175 B2* | 9/2012 | Baltatu | ................ | G06K 9/6284 382/118 |
| 8,401,245 B2* | 3/2013 | Hashimoto | ........ | G07C 9/00158 340/5.52 |
| 8,655,027 B1* | 2/2014 | Olthoff | .................... | G06K 9/00 382/115 |
| 2011/0135166 A1 | 6/2011 | Wechsler et al. | | |
| 2016/0203305 A1* | 7/2016 | Suh | ......................... | G06F 21/32 382/118 |

FOREIGN PATENT DOCUMENTS

| | | |
|---|---|---|
| JP | 2007148872 A | 6/2007 |
| JP | 2010157073 A | 7/2010 |
| JP | 5531963 B2 | 6/2014 |
| KR | 20040039788 A | 5/2004 |

* cited by examiner

*Primary Examiner* — Amir Alavi

(74) *Attorney, Agent, or Firm* — Harness, Dickey & Pierce, P.L.C.

(57) ABSTRACT

A method for authenticating a user includes generating an image for authentication based on at least one authenticated image based on an input image, and performing authentication based on the generated image for authentication.

27 Claims, 15 Drawing Sheets

FIG. 12
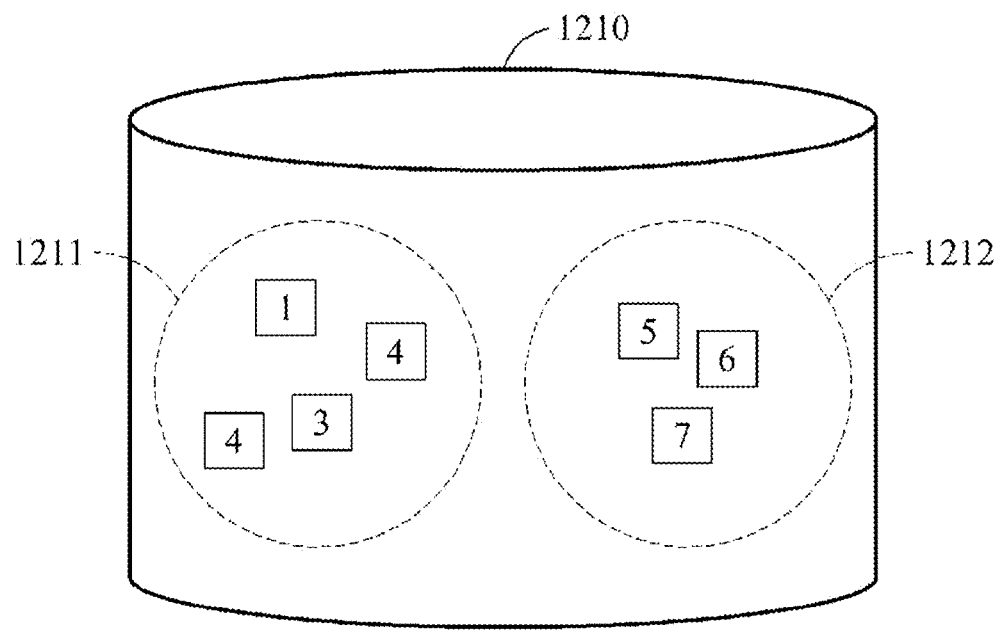
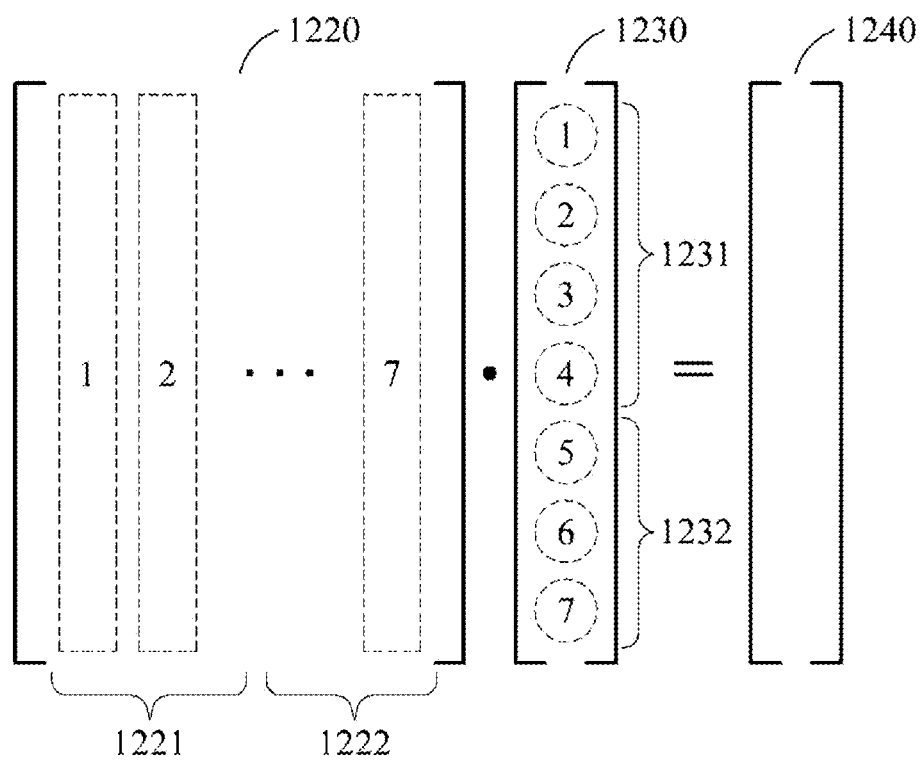

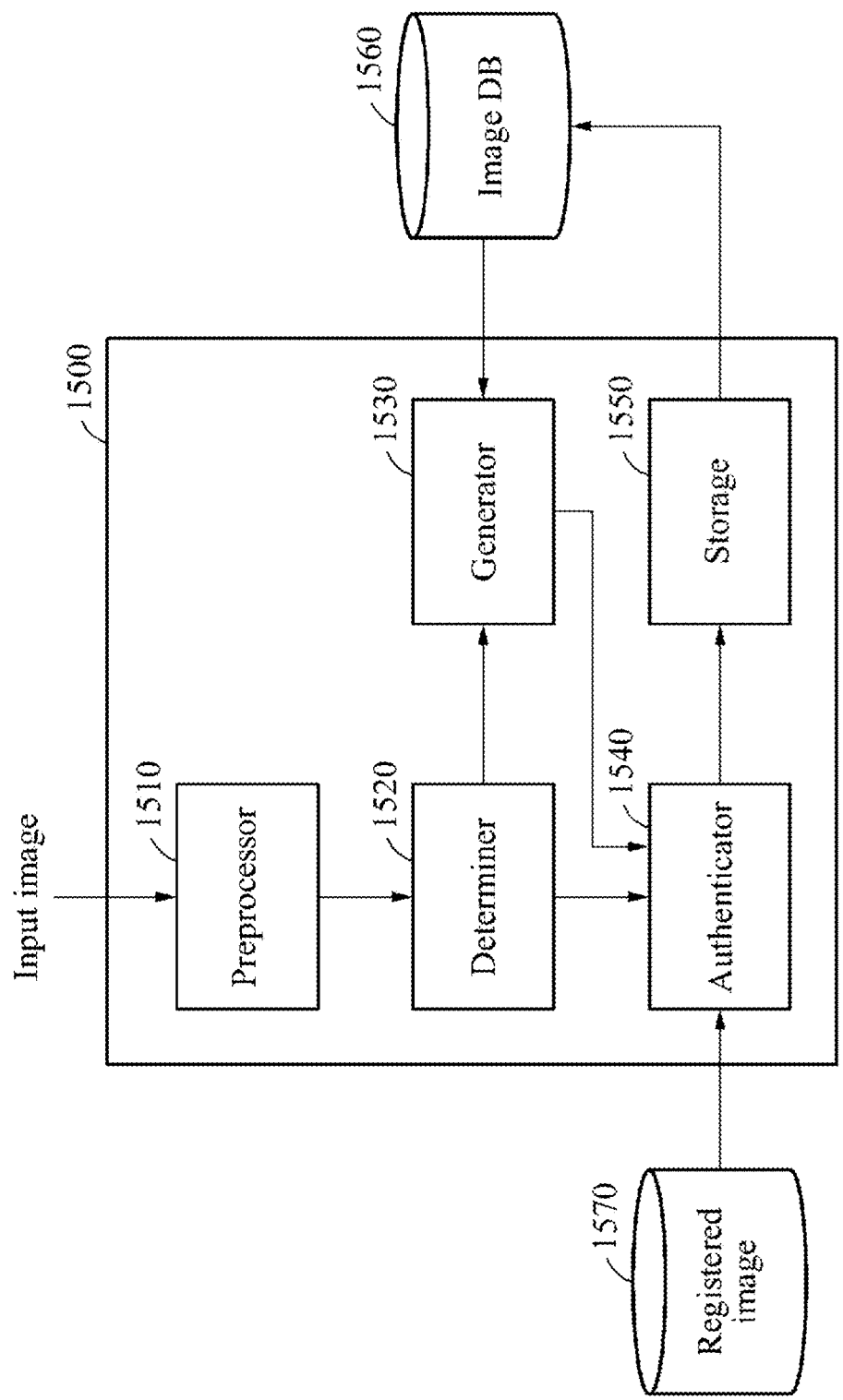

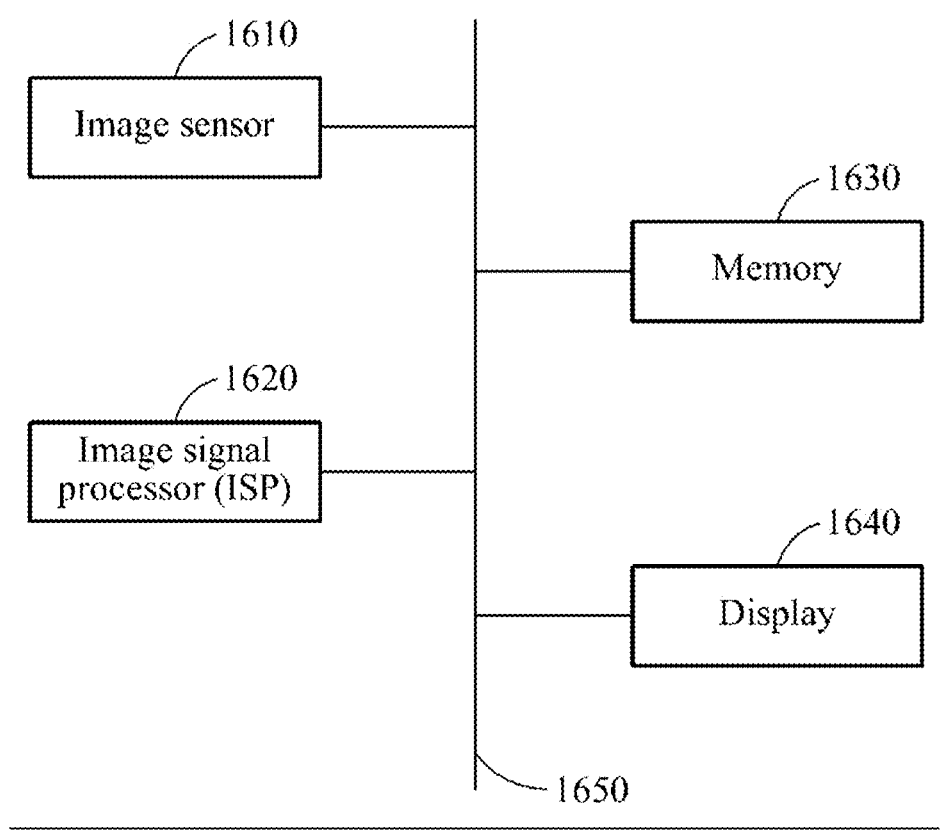

METHOD AND APPARATUS FOR AUTHENTICATING USER

CROSS-REFERENCE TO RELATED APPLICATION

This application claims under 35 U.S.C. §119 to Korean Patent Application No. 10-2015-0005971, filed on Jan. 13, 2015, in the Korean Intellectual Property Office, the entire contents of which are incorporated herein by reference in its entirety.

BACKGROUND

1. Field

At least some example embodiments relate to a method and apparatus for authenticating a user.

2. Description of the Related Art

With the development of electronic technology, a variety of electronic products are in use and various types of services are provided from the electronic products. Accordingly, a limited service may be provided to a selected and/or predetermined user, which leads to requiring technology for allowing a user authenticated through a user authentication process to utilize a service.

In the related art, user authentication is performed using a password input method. In this method, a user is aware of a password at all times. Once the password is leaked, a user not granted a right to use a service may be authenticated.

SUMMARY

Accordingly, research for authenticating a user using a facial recognition technology has been conducted. However, in the facial recognition technology according to the related art may not accurately recognize a user. In particular, when a face of the user is occluded with, for example, sunglasses, glasses, and a mask, the facial recognition accuracy is significantly decreased.

At least one example embodiment relates to an authentication method.

According to an example embodiment, the authentication method may include receiving an input image, selecting at least one of a plurality of authenticated images based on the input image, generating an image for authentication based on the selected at least one authenticated image, and performing authentication based on the image for authentication. The input image may include a partially occluded face.

The selecting may include determining weights of the authenticated images, respectively, based on a first element associated with a similarity between the input image and the respective authenticated image and a second element associated with a number of the plurality of authenticated images to be selected. The generating may include calculating a weighted summation of feature values of the authenticated images based on weights of the authenticated images.

The performing the authentication may include at least one of generating a first result based on a registered image and the image for authentication, and generating a second result based on the input image and the image for authentication. The performing of the authentication may further include determining performing of the authentication based on at least one of the first comparison result and the second comparison result.

At least one example embodiment relates to an authentication apparatus.

According to another example embodiment, the authentication apparatus may include generator configured to generate an image for authentication corresponding to an input image of a user using at least a portion of images from among images of another user and authenticated images stored in a database, and authenticate the user based on the image for authentication.

The authentication apparatus may include a selector. The selector may be configured to select the at least a portion of images based on a first element and a second element, the first element is associated with a similarity between the input image and the images of another user and authenticated images and the second element is associated with the number of the at least a portion of images. The generator may be configured to calculate a weighted summation of feature values of selected authenticated images between the selected authenticated images and selected users of another user to generate the image for authentication.

At least one example embodiment discloses an authentication apparatus including a memory configured to store instructions and a processor configured to execute the instructions such that the processor is configured to generate an image for authentication corresponding to an input image of a user using at least a portion of images from among images of another user and authenticated images stored in a database, the input image including a face of the user and authenticate the user based on the image for authentication.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of example embodiments, taken in conjunction with the accompanying drawings of which:

FIG. 12 illustrates an example of using authenticated images and images of another user stored in an image database according to at least one example embodiment;

FIG. 15 is a block diagram illustrating a configuration of an authentication apparatus according to at least one example embodiment; and FIG. 16 is a block diagram illustrating an electronic system according to at least one example embodiment.

DETAILED DESCRIPTION

Figure 1:
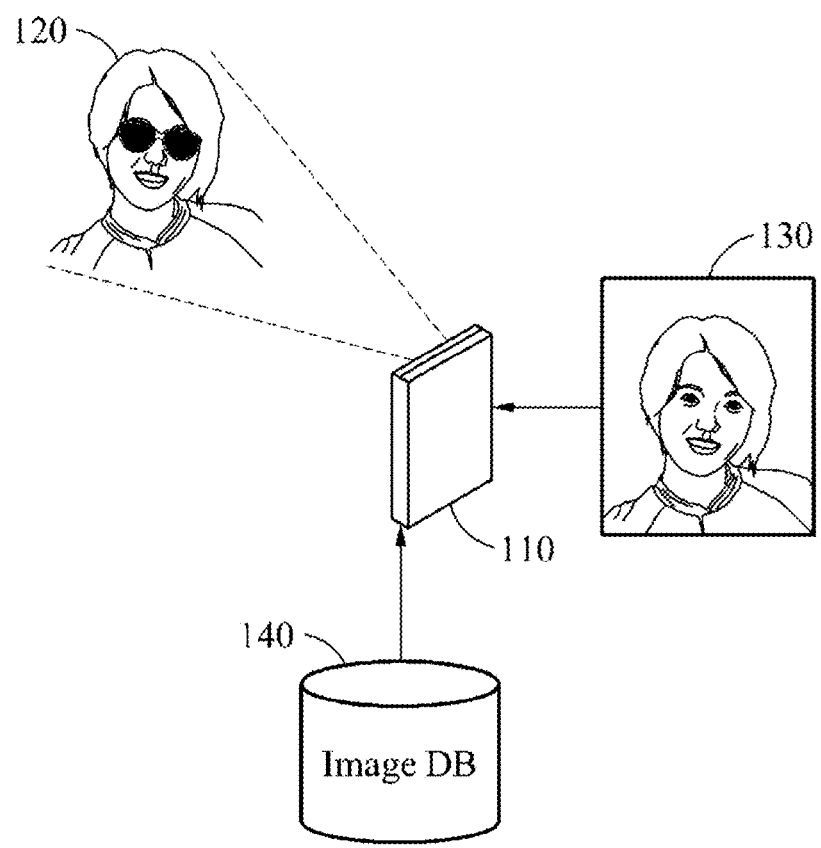
FIG. 1 illustrates an operation of an authentication apparatus according to at least one example embodiment.

Reference will now be made in detail to example embodiments, examples of which are illustrated in the accompanying drawings, wherein like reference numerals refer to like elements throughout. Example embodiments are described below to explain the present disclosure by referring to the figures.

In the drawings, the thicknesses of layers and regions are exaggerated for clarity. Like reference numerals in the drawings denote like elements.

Detailed illustrative embodiments are disclosed herein. However, specific structural and functional details disclosed herein are merely representative for purposes of describing example embodiments. Example embodiments may be embodied in many alternate forms and should not be construed as limited to only those set forth herein.

It should be understood, however, that there is no intent to limit this disclosure to the particular example embodiments disclosed. On the contrary, example embodiments are to cover all modifications, equivalents, and alternatives falling within the scope of the example embodiments. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of this disclosure. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Various example embodiments will now be described more fully with reference to the accompanying drawings in which some example embodiments are shown. Example embodiments may be used to authenticate a user face. Example embodiments may be configured in various types of products, for example, a personal computer, a laptop computer, a tablet computer, a smartphone, a television (TV), a smart electronic device, an intelligent vehicle, a kiosk, and a wearable device.

FIG. 1 illustrates an operation of an authentication apparatus according to at least one example embodiment. Referring to FIG. 1, the authentication apparatus 110 authenticates a user 120. The authentication apparatus 110 may determine whether the user 120 is a registered user. The authentication apparatus 110 may authenticate the user 120 (or recognize a face of the user 120) using an input image captured from the user 120 and a registered image 130.

The authentication apparatus 110 may generate the input image by directly taking a photo of the user 120, and if necessary, may also receive the input image captured from the user 120 from an external device connected in a wired or wireless manner. The registered image 130 includes a face of the registered user. The authentication apparatus 110 may store the registered image 130 in a storage space such as a memory. Depending on example embodiments, the registered image 130 may be stored in a server and may be transmitted from the server to the authentication apparatus 110 in response to a request of the authentication apparatus 110. The authentication apparatus 110 may detect a facial region from the input image, and may normalize the detected facial region. Hereinafter, the input image may be referred to as a normalized facial region.

The user 120 may put on, for example, sunglasses, glasses, a mask and a hair band, which may partially occlude a face of the user 120. When the face of the user 120 is partially occluded, the authentication apparatus 110 may not readily determine whether the user 120 is identical to the registered user through simple comparison between the input image and the registered image 130.

Figure 2:
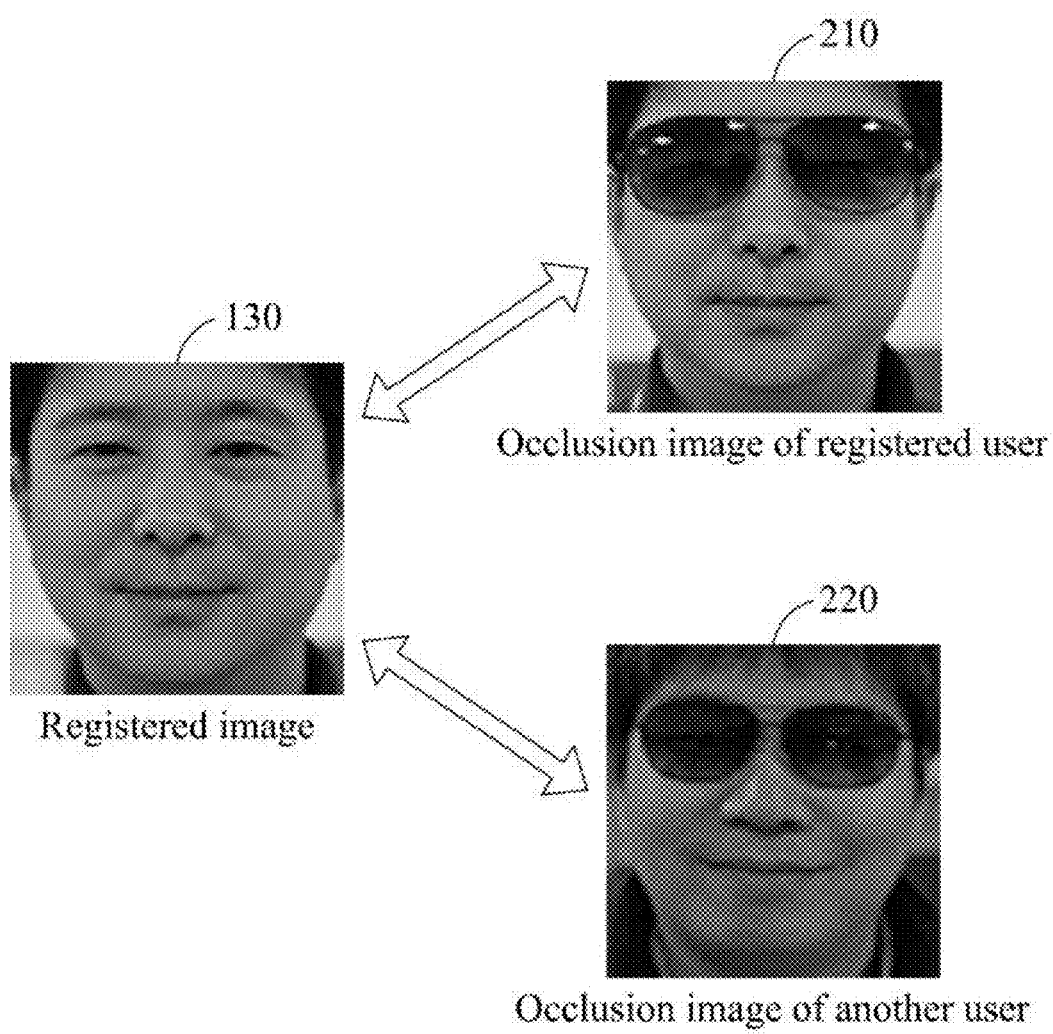
FIG. 2 illustrates an example of comparing a registered image and an occlusion image according to at least one example embodiment.

For example, referring to FIG. 2, when a registered user puts on sunglasses, the authentication apparatus 110 may acquire a first input image 210. Due to the sunglasses, a region around eyes is occluded and the authentication apparatus 110 may not readily determine whether a user included in the first input image 210 is identical to a user included in the registered image 130. Alternatively, when another user puts on sunglasses, the authentication apparatus 110 may acquire a second input image 220. Due to the sunglasses, a region around eyes is occluded and the authentication apparatus 110 may not readily determine whether a user included in the second input image 220 differs from the user included in the registered image 130.

Due to occlusion present in a facial region within an input image, an intra-class variation indicating a variation between identical persons may be greater than an inter-class variation indicating a variation between different users.

When occlusion is present in the facial region within the input image, the facial recognition performance may be degraded.

The authentication apparatus 110 may generate an image for authentication using images stored in an image database (DB) 140, and may provide technology for authenticating the user 120 regardless of occlusion present in the input image. As an example, the image database 140 may store authenticated images. The authenticated images may be images of a registered user successfully authenticated. Occlusion may be absent in the authenticated images. The registered image 130 may be used as one of the authenticated images stored in the image database 140.

The authentication apparatus 110 may select images corresponding to the input image captured from the user 120 from among authenticated images that are stored in the image database 140. The authentication apparatus 110 may generate an image for authentication by combining the selected images. Occlusion is absent in the authenticated images and thus, the image for authentication may not include the occlusion. The authentication apparatus 110 may restore the image for authentication in which the occlusion is absent using previous images successfully authenticated.

The authentication apparatus 110 may authenticate the user 120 by comparing the image for authentication and the registered image 130. To improve the authentication performance, the authentication apparatus 110 may compare the image for authentication and the input image. The authentication apparatus 110 may restore the image for authentication in which the occlusion is absent and may compare the image for authentication to the registered image 130 or the input image and thus, may perform user authentication without losing information.

For example, the image database 140 may further store images of another user in addition to the authenticated images. In this example, the authentication apparatus 110 may generate an image for authentication using the authenticated images and the images of another user. The authentication apparatus 110 may authenticate the user 120 based on whether an image of another user is selected to generate the image for authentication.

The image database 140 may be continuously updated. For example, the authentication apparatus 110 may determine whether occlusion is present in an input image. When the occlusion is determined to be absent in the input image, the authentication apparatus 110 may compare the input image and the registered image 130 without separately generating an image for authentication. When the authentication succeeds as a result of the comparison, the authentication apparatus 110 may store the input image in the image database 140 as a registered image. Conversely, when the authentication fails, the authentication apparatus 110 may store the input image in the image database 140 as an image of another user.

Figure 3:
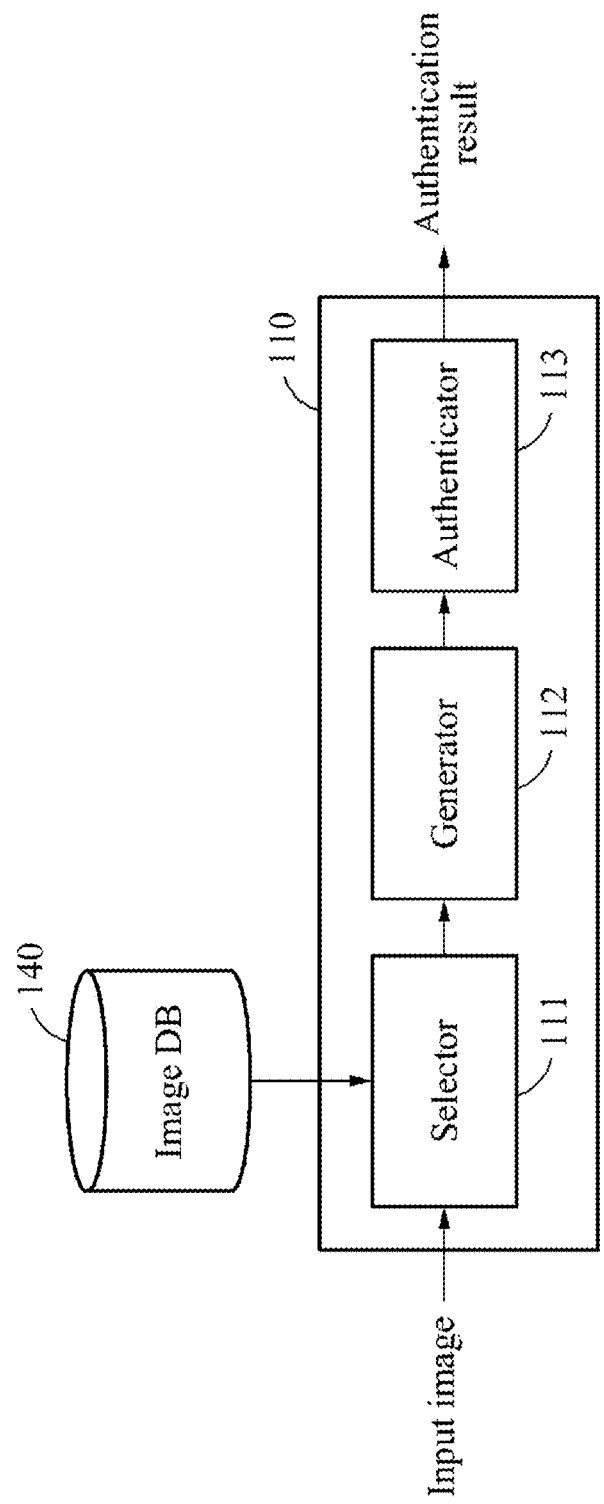
FIG. 3 is a block diagram illustrating an authentication apparatus according to at least one example embodiment.

FIG. 3 is a block diagram illustrating an authentication apparatus according to at least one example embodiment. Referring to FIG. 3, the authentication apparatus 110 includes a selector 111, a generator 112, and an authenticator 113. The selector 111 receives an input image. The input image, as an image captured from a user, may be an image including a partially occluded face due to, for example, sunglasses, glasses, a mask, and a hair band put on by the user.

The selector 111 selects at least one of authenticated images that are stored in the image database 140, based on the received input image. The authenticated images refer to images each including a face of a registered user having been successfully authenticated. The authenticated images may not include an occlusion. For example, when a registered user is to be authenticated without putting on, for example, sunglasses, glasses, a mask, and a hair band, the image database 140 may be updated.

The selector 111 may select at least one authenticated image from among the authenticated images stored in the image database 140, based on a first element associated with a similarity between the input image and authenticated images to be selected and a second element associated with the number of authenticated images to be selected. For example, the selector 111 may determine weights of selected authenticated images according to Equation 1.

$$\hat{x} = \arg\min_{x}\{\|y - Dx\|_2^2 + \lambda\|x\|_1\} \quad \text{[Equation 1]}$$

Figure 4:
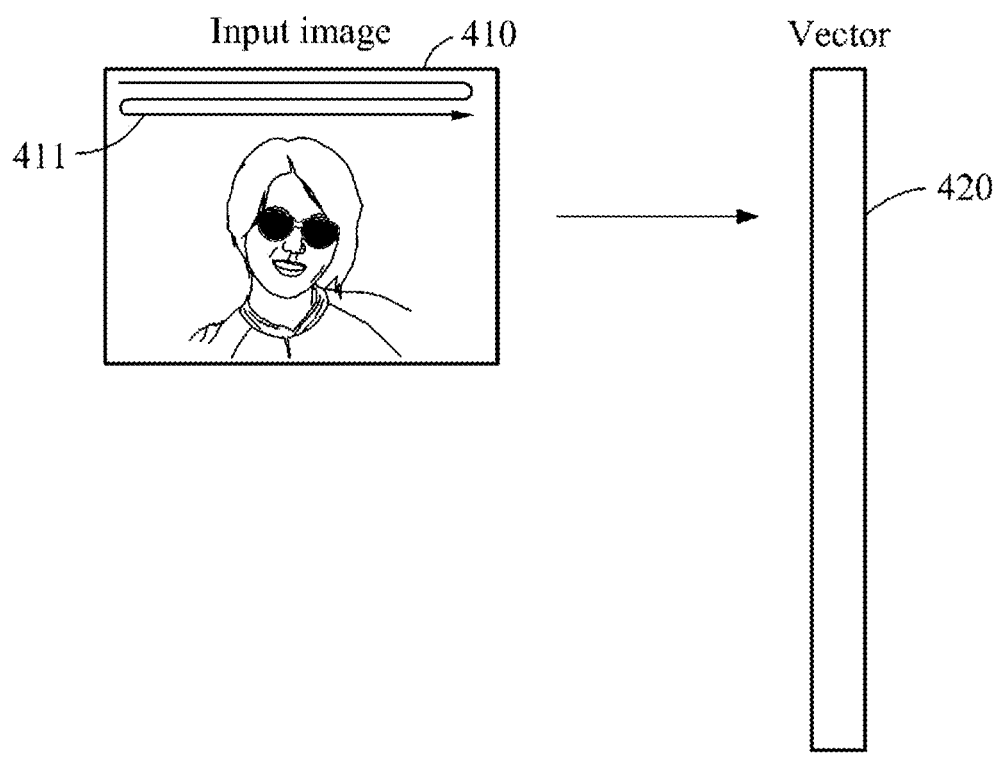
FIG. 4 illustrates an operation of converting an input image to a vector according to at least one example embodiment.

In Equation 1, $\|y-Dx\|_2^2$ denotes the first element. The first element may be an element to decrease a restoration error, and y denotes a vector corresponding to the input image. Referring to FIG. 4, an input image 410 may be converted to a vector 420. For example, by performing linearization of pixel values two-dimensionally aligned within the input image 410 along a predetermined and/or selected path 411, the input image 410 may be converted to the vector 420. Alternatively, the input image 410 may be segmented into blocks with a predetermined and/or selected size and feature values extracted from the blocks may be included as elements of the vector 420. A feature extracted from each block may use an average of pixel values within a block and a local binary pattern (LBP) feature. The vector y corresponds to the vector 420.

Figure 5:
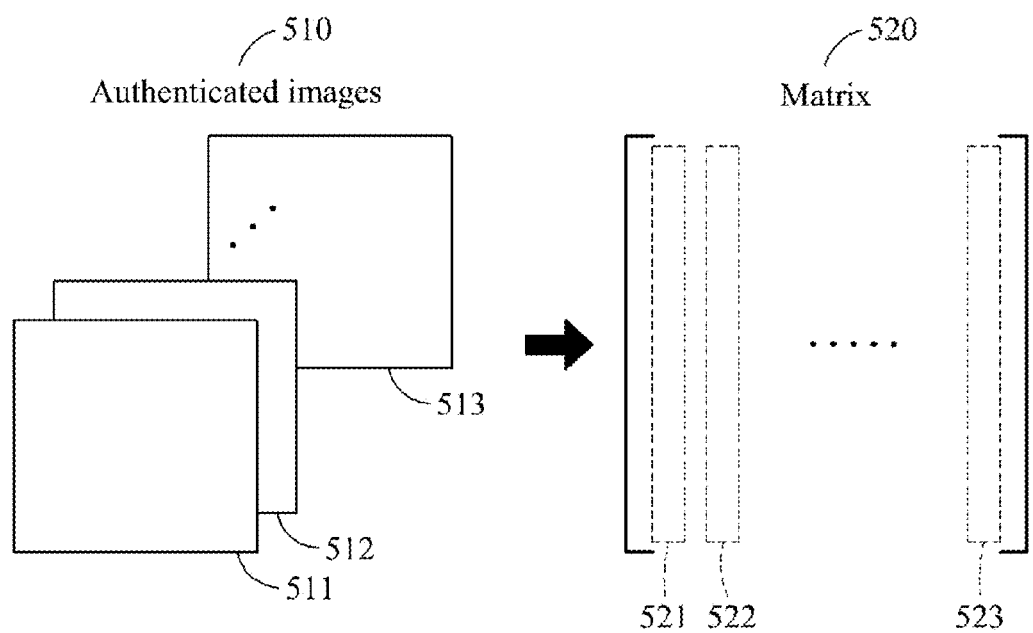
FIG. 5 illustrates an operation of converting authenticated images to a matrix according to at least one example embodiment.

D denotes a matrix corresponding to authenticated images. Referring to FIG. 5, a plurality of authenticated images 510 may be converted to a matrix 520. For example, a first authenticated image 511 may be converted to a first vector 521, a second authenticated image 512 may be converted to a second vector 522, and an n-th authenticated image 513 may be converted to an n-th vector 523. The matrix 520 may include the first vector 521 through the n-th vector 523.

x may be a vector corresponding to weights of authenticated images, and may also be a linear combination coefficient. Elements included in x may correspond to vectors included in the matrix D, respectively. The selector 111 may determine the vector x corresponding to the weights to make a result of multiplying the matrix D corresponding to the authenticated images and the vector x of the weights become similar to a vector y corresponding to the input image.

$\lambda\|x\|_1$ denotes the second element. The second element denotes an element for decreasing the number of authenticated images to be selected. $\lambda$ denotes a scalar coefficient and may determine a relative gravity between the first element and the second element. $\|x\|_1$ denotes the number of elements excluding "0" within the vector x corresponding to the weights. The selector 111 may determine weights of unselected authenticated images as "0". The selector 111 may determine the vector x corresponding to the weights to decrease the number of authenticated images to be selected.

The selector 111 may determine the vector x to minimize a summation of the first element and the second element. In this example, x that satisfies a right side of Equation 1 may be determined as the vector $\hat{x}$ corresponding to the final weights.

Figure 6:
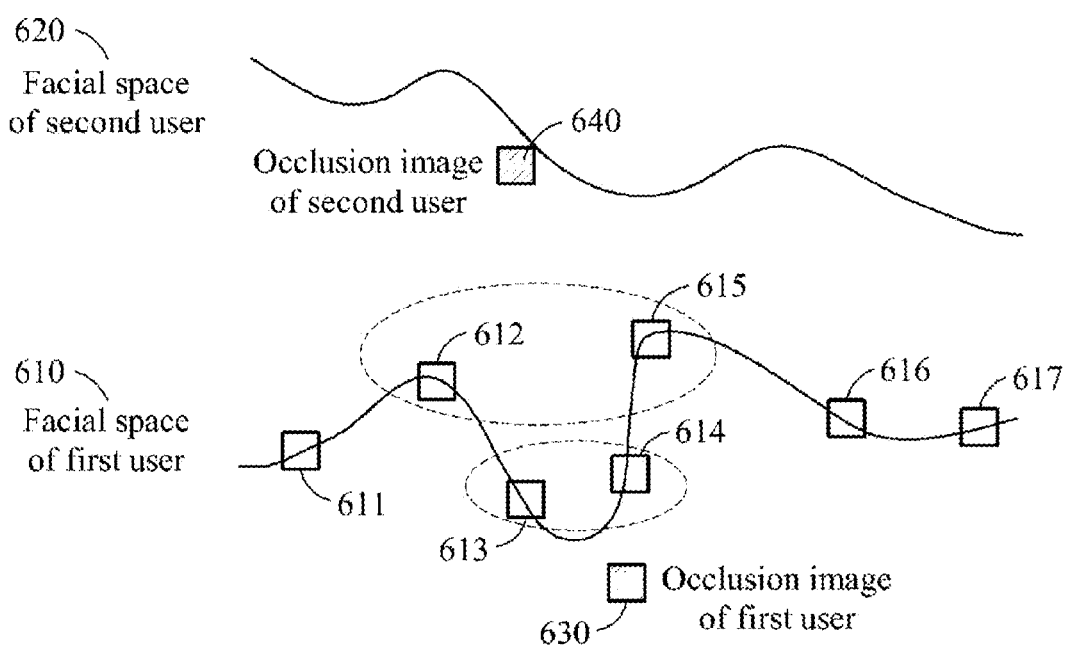
FIG. 6 illustrates an example of selecting authenticated images based on a facial space of a user according to at least one example embodiment.

According to Equation 1, the selector 111 may select authenticated images to generate an image similar to the input image using a combination of minimum authenticated images. Referring to FIG. 6, a space in which faces of the same user are present may be referred to as a facial space of the user. Even a face of the same user may appear different due to a different facial expression, a different angle, and a different illumination. In contrast, even a face of a different user may appear similar due to the same facial expression, the same angle, and the same illumination. For conciseness, in FIG. 6, a facial space of the user is represented on a two-dimensional (2D) plane, and may be represented on a multi-dimensional space.

In an example in which a first user is a registered user and a second user is another user, registered images may include a plurality of images, for example, a first registered image 611, a second registered image 612, a third registered image 613, a fourth registered image 614, a fifth registered image 615, a sixth registered image 616, and a seventh registered image 617 present on a facial space 610 of the first user. For example, when an occlusion image 630 of the first user is received as an input image, the selector 111 may select the third registered image 613 and the fourth registered image 614 to generate an image similar to the input image using a combination of minimum registered images. The occlusion image 630 of the first user refers to an image captured from the first user of which a face is partially occluded due to, for example, sunglasses, glasses, a mask, and a hair band.

For example, when an occlusion image 640 of the second user is received as an input image, the selector 111 may select the second registered image 612 and the fifth registered image 615. The occlusion image 640 of the second user refers to an image captured from the second user of which a face is partially occluded due to, for example, sunglasses, glasses, a mask, and a hair band.

The generator 112 generates an image for authentication based on the selected at least one authenticated image. For example, the generator 112 may calculate a weighted summation of feature values of selected authenticated images based on weights of authenticated images determined by the selector 111.

Figure 7:
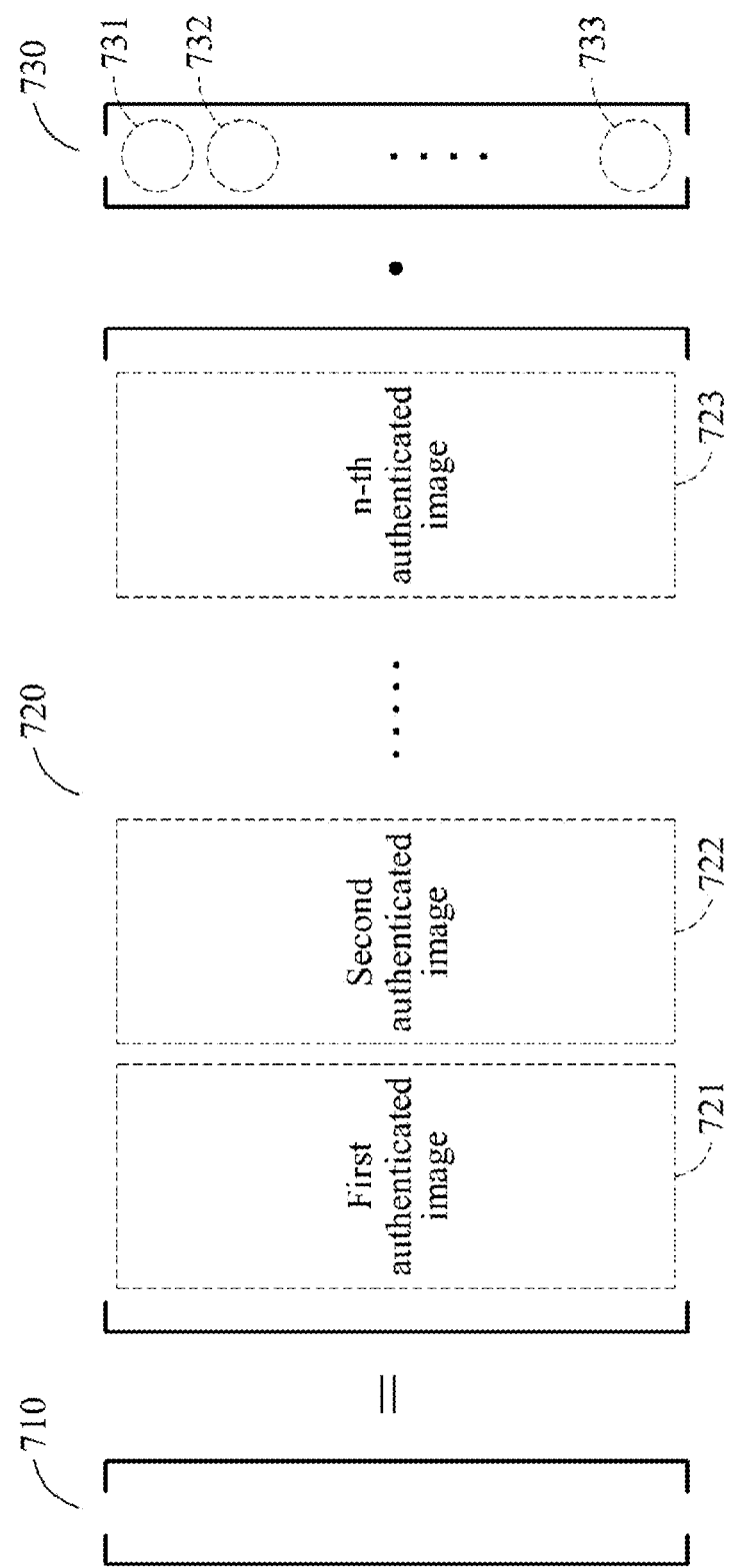
FIG. 7 illustrates an operation of generating an image for authentication according to at least one example embodiment.

Referring to FIG. 7, a matrix 720 corresponds to a plurality of authenticated images stored in the image database 140. The matrix 720 may include vectors 721 through 723 corresponding to the respective authenticated images. A vector 730 corresponds to weights determined by the selector 111. The vector 730 includes elements 731 through 733 corresponding to the respective weights of authenticated images. The selector 111 may generate a vector 710 corresponding to an image for authentication by multiplying the matrix 720 and the vector 730.

The authenticator 113 performs authentication based on the generated image for authentication. When an input image in which a face of a registered user is partially occluded is received, an image for authentication to be generated may be present on a facial space of the registered user. Also, an error between the image for authentication to be generated and the input image may be insignificant because each of the authenticated images of the registered user stored in the image database 140 represents a face of the registered user regardless of partial occlusion in the face of the registered user. In this example, the image for authentication to be generated may represent the face of the registered user similar to the input image in which the occlusion is present.

When an input image in which a face of another user is partially occluded is received, the image for authentication to be generated may be absent on a facial space of the registered user. Also, an error between the image for authentication to be generated and the input image may be significant because authenticated images of the registered user stored in the image database 140 do not represent the face of the other user.

Figure 8:
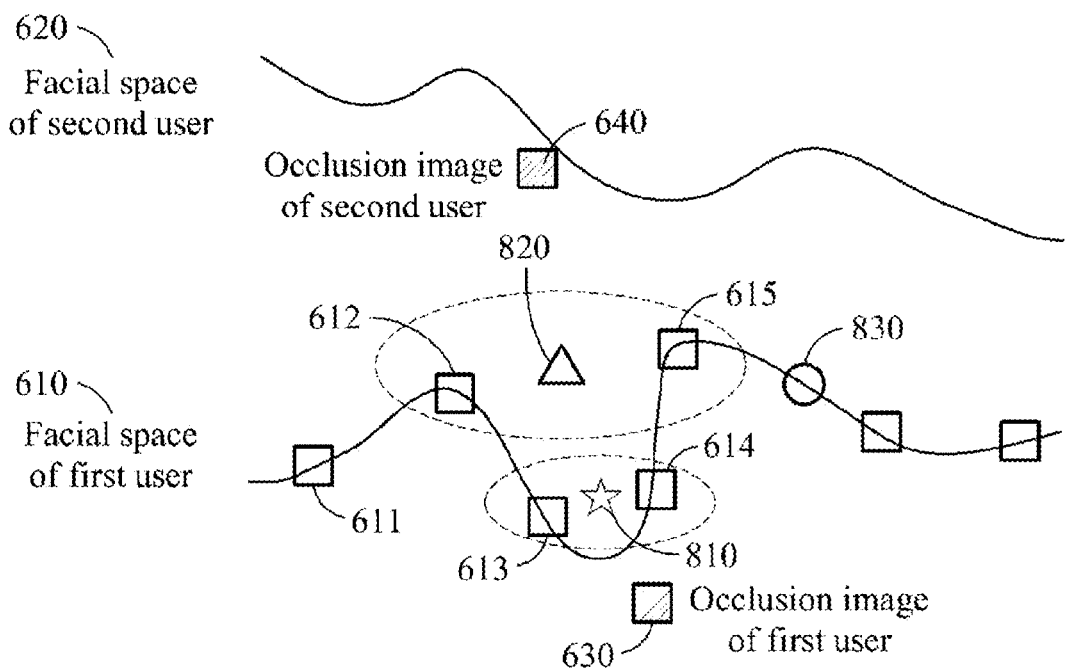
FIG. 8 illustrates an operation of performing authentication based on a facial space of a user according to at least one example embodiment.

The authenticator 113 may perform authentication based on whether the generated image for authentication is present on the facial space of the registered user. Referring to FIG. 8, when the first user is a registered user and an input image is the occlusion image 630 of the first user, the third authenticated image 613 and the fourth authenticated image 614 may be selected. An image for authentication 810 generated using a combination of the third authenticated image 613 and the fourth authenticated image 614 may be present on the facial space 610 of the first user.

The authenticator 113 may determine whether the image for authentication 810 is present on the facial space 610 of the first user, and may determine that the authentication is a success when the image for authentication 810 is determined to be present on the facial space 610 of the first user. For example, the authenticator 113 may calculate a distance between the image for authentication 810 and a registered image 830. The distance may be a distance based on a curve that represents the facial space 610 of the first user. The registered image 830 is located on the facial space 610 of the first user, and the image for authentication 810 is located at a point adjacent to the curve that represents the facial space 610 of the first user. In this example, the distance between the image for authentication 810 and the registered image 830 may be calculated to be a small value sufficient to be determined that the image for authentication 810 is present on the facial space 610 of the first user.

When the input image is the occlusion image 640 of the second user, the second authenticated image 612 and the fifth authenticated image 615 may be selected. An image for authentication 820 generated using a combination of the second authenticated image 612 and the fifth authenticated image 615 may be absent on the facial space 610 of the first user. The authenticator 113 may determine whether the image for authentication 820 is present on the facial space 610 of the first user and may determine that the authentication is a failure when the image for authentication 820 is determined to be absent on the facial space 610 of the first user. For example, the authenticator 113 may calculate a distance between the image for authentication 820 and the registered image 830. Here, the distance may be a distance based on a curve that represents the facial space 610 of the first user. The image for authentication 820 may be located at a point separate from the curve that represents the facial space 610 of the first user by at least a predetermined and/or selected distance. In this example, the distance between the image for authentication 820 and the registered image 830 may be calculated to be a large value sufficient to be determined that the image for authentication 820 is absent on the facial space 610 of the first user.

Figure 9:
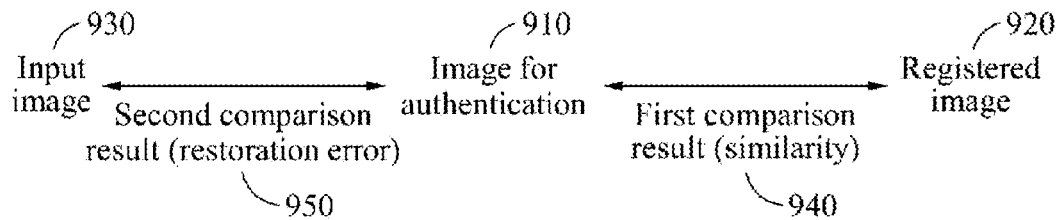
FIG. 9 illustrates an operation of comparing an image for authentication, a registered image, and an input image according to at least one example embodiment.

The authenticator 113 may determine whether an image for authentication is present on a facial space of a registered user based on a first comparison result between the image for authentication and a registered image and/or a second comparison result between the image for authentication and an input image. For example, referring to FIG. 9, the authenticator 113 may generate a first comparison result 940 by comparing an image for authentication 910 and a registered image 920. More specifically, the authenticator 113 may calculate a similarity between the image for authentication 910 and the registered image 920 by comparing pixels of the image for authentication 910 and corresponding pixels of the registered image 920. Here, coordinates of the corresponding pixels of the registered image 920 may correspond to coordinates of the pixels of the image for authentication 910. Alternatively, the authenticator 113 may segment the image for authentication 910 into a plurality of blocks, and may compare a feature of each segmented block and a correspondence feature of the registered image 920.

The authenticator 113 may use various types of distances to generate the first comparison result 940. For example, the authenticator 113 may generate the first comparison result 940 using a cosine distance. The cosine distance refers to a distance for calculating a distance between vectors and a difference of an angle between corresponding vectors may be calculated.

When a similarity is greater than a first threshold, the authenticator 113 may determine that an image for authentication is present on a facial space of a registered user. When the similarity is less than the first threshold, the authenticator 113 may determine that the image for authentication is absent on the facial space of the registered user.

When the similarity is equal to the first threshold, the authenticator 113 may determine whether the image for authentication is present on the facial space of the registered user using a predetermined and/or selected method. For example, when the similarity is equal to the first threshold, the image for authentication may be determined in advance to be present on the facial space of the registered user, which is similar to a case in which the similarity is greater than the first threshold. In another example, when the similarity is equal to the first threshold, the image for authentication may be determined in advance to be absent on the facial space of the registered user, which is similar to a case in which the similarity is less than the first threshold.

The authenticator 113 may generate a second comparison result 950 by comparing the image for authentication 910 and an input image 930. For example, the authenticator 113 may calculate a restoration error of the image for authentication 910 generated from the input image 930 by comparing pixels of the image for authentication 910 and corresponding pixels of the input image 930. Alternatively, the authenticator 113 may segment the image for authentication 910 into a plurality of blocks, and may compare a feature of each segmented block and a correspondence feature of the input image 930.

The authenticator 113 may use various types of distances to generate the second comparison result 950. For example, the authenticator 113 may generate the second comparison result 950 using a Euclidean distance. The Euclidean distance refers to a distance for calculating a distance on a Euclidean space and a difference between corresponding pixel values or feature values may be calculated. The Euclidean space may correspond to a facial space.

When a restoration error is less than a second threshold, the authenticator 113 may determine that an image for authentication is present on a facial space of a registered user. When the restoration is greater than the second threshold, the authenticator 113 may determine that the image for authentication is absent on the facial space of the registered user. When the restoration error is equal to the second threshold, the authenticator 113 may determine whether the image for authentication is present on the facial space of the registered user using a predetermined and/or selected method.

The authenticator 113 may determine whether the authentication is a success based on the first comparison result and the second comparison result. For example, when all of a first condition associated with the first comparison result (e.g., similarity greater than the first threshold) and a second condition associated with the second comparison result (e.g., error less than the second threshold) are satisfied, the authenticator 113 may determine that the authentication is a success.

Figure 10:
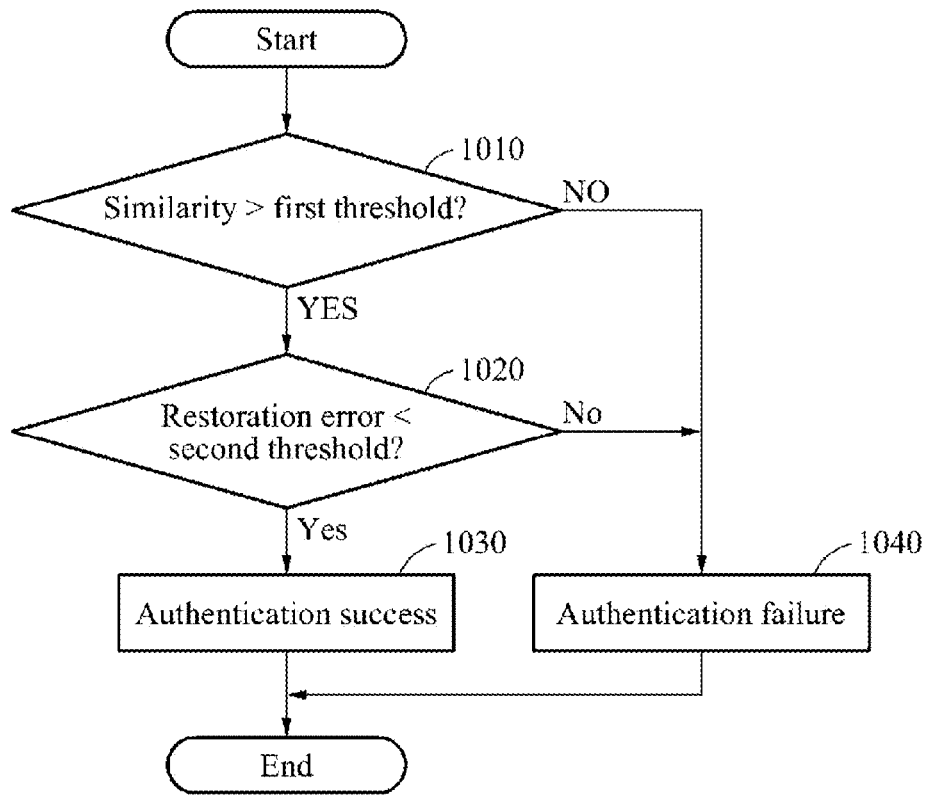
FIG. 10 is a flowchart illustrating a method of performing authentication using a similarity and a restoration error according to at least one example embodiment.

Referring to FIG. 10, in operation 1010, the authenticator 113 may determine whether a first condition associated with a first comparison result is satisfied. For example, the authenticator 113 may determine whether a similarity between an image for authentication and a registered image is greater than a first threshold. In operation 1020, the authenticator 113 may determine whether a second condition associated with a second comparison result is satisfied. For example, the authenticator 113 may determine whether a restoration error of the image for authentication generated from an input image is less than a second threshold.

In operation 1030, when all of the first condition associated with the first comparison result and the second condition associated with the second comparison result are satisfied, the authenticator 113 may determine that the authentication is a success. In operation 1040, when any one of the first condition associated with the first comparison result and the second condition associated with the second comparison result is not satisfied, the authenticator 113 may determine that the authentication is a failure.

Figure 11:
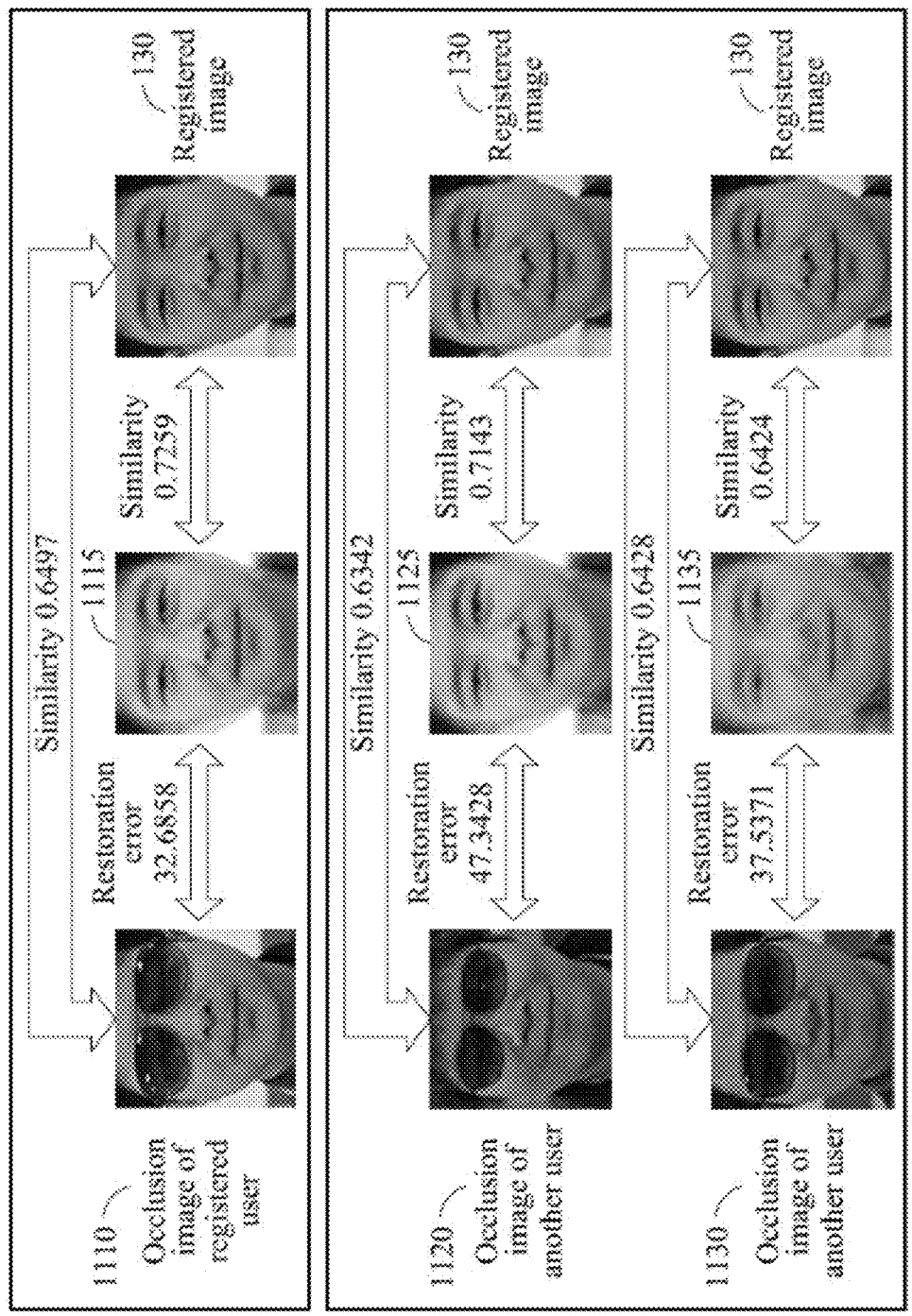
FIG. 11 illustrates an example of an authentication result according to at least one example embodiment.

FIG. 11 illustrates an example of an authentication result according to at least one example embodiment. Referring to FIG. 11, in examples in which an occlusion image 1110 of a registered user is received, in which an occlusion image 1120 of another user is received, and in which an occlusion image 1130 of another user is received, similarities calculated through simple comparison with the registered image 130 of the registered user show insignificant difference. For example, a similarity between the occlusion image 1110 of the registered user and the registered image 130 may be 0.6497, a similarity between the occlusion image 1120 of another user and the registered image 130 may be 0.6342, and a similarity between the occlusion image 1130 of another user and the registered image 130 may be 0.6428. Accordingly, with the simple comparison using the occlusion images 1120 and 130 and the registered image 130, whether a user included in a corresponding occlusion image is identical to a user included in the registered image 130 may not be determined.

According to example embodiments, in each of examples in which the occlusion image 1110 of the registered user, the occlusion image 1120 of another user and the occlusion image 1130 of another user are received, a similarity between an image for authentication and the registered image 130 and a restoration error of the image for authentication generated from the input image may be calculated. Hereinafter, a first threshold associated with the similarity may be "0.7" and a second threshold associated with the restoration error may be "40".

When the occlusion image 1110 of the registered user is received, an image for authentication 1115 may be generated. In this example, a similarity between the image for authentication 1115 and the registered image 130 may be calculated as 0.7259. Also, a restoration error of the image for authentication 1115 generated from the occlusion image 1110 may be calculated as 32.6858. Since the similarity is greater than 0.7 corresponding to the first threshold and the restoration error is less than 40 corresponding to the second threshold, an authentication apparatus may determine that the authentication is a success.

When the occlusion image 1120 of another user is received, an image for authentication 1125 may be generated. In this example, a similarity between the image for authentication 1125 and the registered image 130 may be calculated as 0.7143. Also, a restoration error of the image for authentication 1125 generated from the occlusion image 1120 may be calculated as 47.3428. The similarity is greater than 0.7 corresponding to the first threshold, and the restoration error is greater than 40 corresponding to the second threshold. Thus, the authentication apparatus may determine that the authentication is a failure.

When the occlusion image 1130 of another user is received, an image for authentication 1135 may be generated. In this example, a similarity between the image for authentication 1135 and the registered image 130 may be calculated as 0.6424. Also, a restoration error of the image for authentication 1135 generated from the occlusion image 1130 may be calculated as 37.5371. The restoration error is less than 40 corresponding to the second threshold and the similarity is less than 0.7 corresponding to the first threshold. Thus, the authentication apparatus may determine that the authentication is a failure.

FIG. 12 illustrates an example of using authenticated images and images of another user stored in an image database according to at least one example embodiment. Referring to FIG. 12, the image database 1210 may store authenticated images 1211 of a registered user and images 1212 of another user. The images 1212 are images of another user different from the registered user. Here, to accurately determine who the other user is does not become an issue to determine the images 1212 of another user, and that the other user differs from the registered user may be utilized. The authenticated images 1211 and the images 1212 of another user may be images in which occlusion is absent.

The image database 1210 may be continuously updated. For example, the authentication apparatus may determine whether an occlusion is present in an input image. When the occlusion is determined to be absent in the input image, the authentication apparatus may compare the input image and the registered image. When the authentication is a success as a comparison result, the authentication apparatus may store the input image in the image database 1210 as an authenticated image. Conversely, when the authentication is a failure as the comparison result, the authentication apparatus may store the input image in the image database 1210 as an image of another user.

The authentication apparatus may perform user authentication based on the authenticated images 1211 and the images 1212 of another user that are stored in the image database 1210. For example, when an occlusion image is received, the authentication apparatus may select at least a portion from among the authenticated images 1211 and the images 1212 of another user stored in the image database 1210.

The authentication apparatus may select images according to Equation 1. In this example, a matrix 1220 may include vectors 1221 corresponding to the authenticated images 1211 and vectors 1222 corresponding to the images 1212 of another user. The authentication apparatus may determine a vector 1230 according to Equation 1. The vector 1230 may include weights 1231 of the authenticated images 1211 and weights 1232 of the images 1212 of another user. The authentication apparatus may determine weights of unselected images as "0".

The authentication apparatus may generate an image for authentication using only selected authenticated images between the selected authenticated images and selected images of another user. For example, when a selection of images from the image database 1210 is completed, the authentication apparatus may set the weights 1232 as "0". To generate the image for authentication, the authentication apparatus may calculate a weighted summation of feature values of the selected authenticated images based on the weights of the selected authenticated images.

When the input image is an occlusion image of the registered user, images may be selected from among the authenticated images 1211 of the registered user. The authenticated images 1211 may be present on a facial space of the registered user and a face of the registered user may be represented using a combination of the authenticated images 1211. In this example, the image for authentication includes features suitable for the registered image and/or the input image and thus, the authentication apparatus may determine that the authentication is a success.

Conversely, when the input image is an occlusion image of another user, images may be selected from among the authenticated images 1211 and the images 1212 of another user because a face of the other user cannot be represented using a combination of the authenticated images 1211 of the registered user. The image for authentication is generated using only the selected authenticated images without using the selected images of the other user and thus, may not include features suitable for the registered image and/or the input image. The authentication apparatus may determine that the authentication is a failure.

Alternatively, the authentication apparatus may determine user authentication based on a ratio of images of the other user in the selected images. For example, when the ratio of the images of the other user in the selected images is greater than a threshold, the authentication apparatus may determine that the authentication is a failure.

Figure 13:
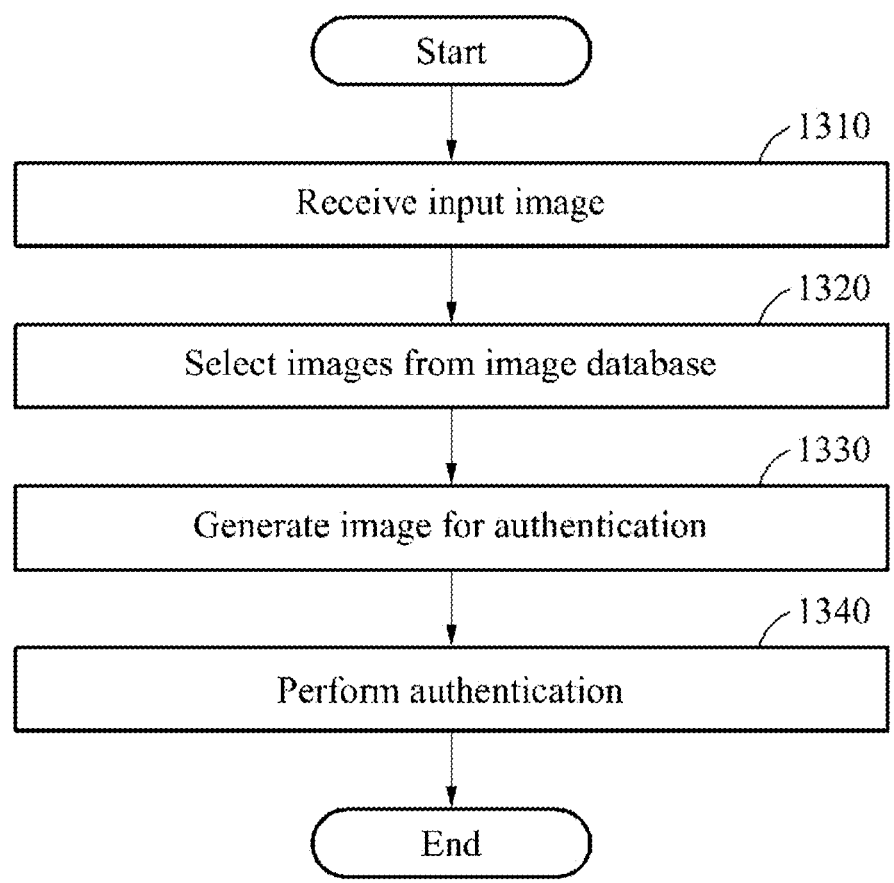
FIGS. 13 and 14 are flowcharts illustrating an authentication method according to at least one example embodiment.
Figure 14:
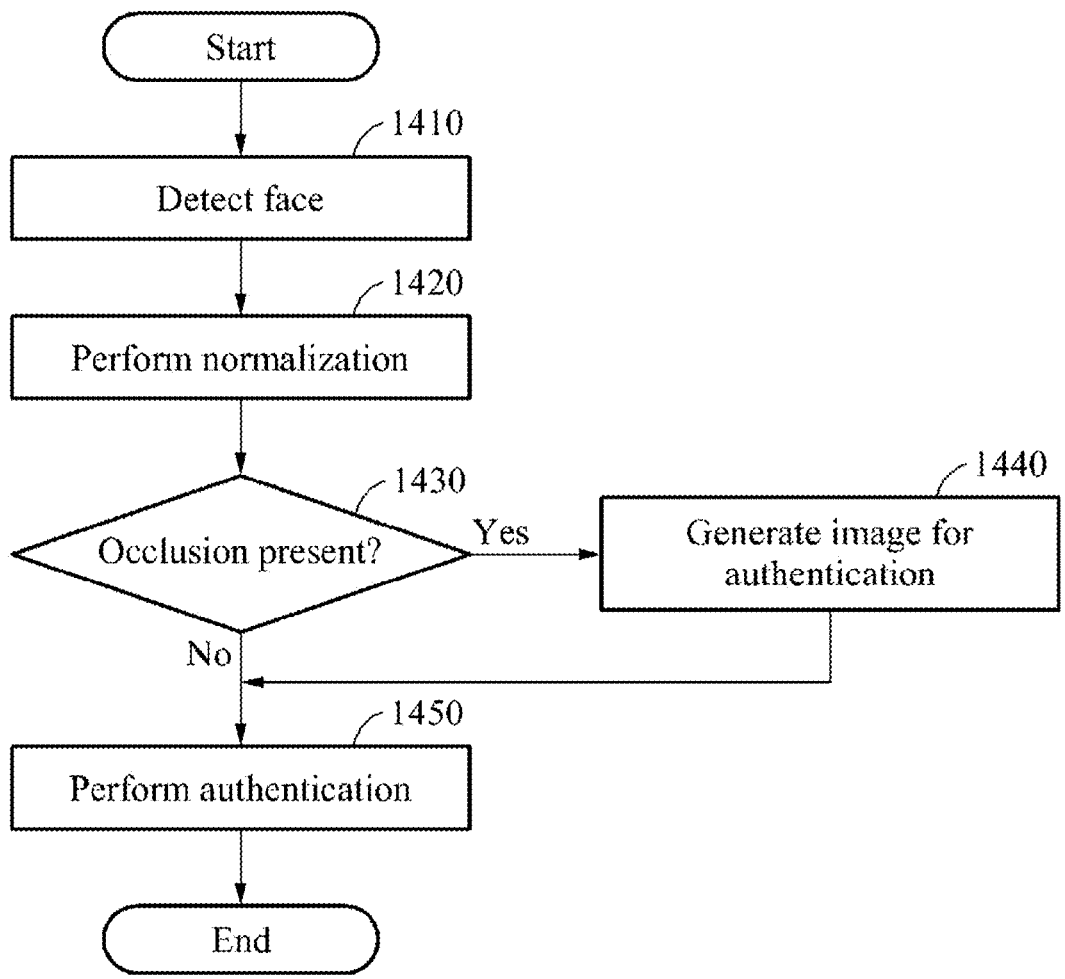

FIGS. 13 and 14 are flowcharts illustrating an authentication method according to example embodiments. The methods of FIGS. 13-14 may be performed by the authentication apparatus 110. Referring to FIG. 13, in operation 1310, an input image is received. In operation 1320, images are selected from an image database. In operation 1330, an image for authentication is generated. In operation 1340, authentication is performed. The aforementioned descriptions of FIGS. 1 through 12 may be applied to operations 1310 through 1340 of FIG. 13 and thus, a further detailed description will be omitted.

Referring to FIG. 14, in operation 1410, a face included in an input image may be detected. In operation 1410, a variety of facial detection algorithms may be applied. For example, primary patterns of a face induced through Haar filter based learning may be utilized to detect a facial region. The primary patterns of the face present in the input image may be scanned and a region including the primary patterns may be detected as a facial region.

In operation 1420, a region corresponding to the detected face may be normalized. In operation 1420, a variety of normalization algorithms may be applied. For example, in operation 1420, a geometric normalization algorithm may be applied. A size and an angle of the face included in the input image may vary based on an environment in which a user image is captured. Thus, the detected facial region may be geometrically normalized. A size and an angle of the facial region may be normalized based on various factors, for example, a size of the detected facial region, a distance between centers of both eyes and a distance between a nose and lips. Also, illumination processing may be performed. The face may be differently represented by an illumination. Thus, noise by an illumination component may be removed.

In operation 1430, whether an occlusion is present in the normalized facial region may be determined. In operation 1430, a variety of occlusion presence determining algorithms may be applied. For example, a location of a landmark such as an eye, an eyebrow, a nose, and lips within the normalized facial region may be detected using a landmark detector. Features may be extracted at a location of each landmark, and the reliability of the features may be calculated. When an occlusion is present in the facial region, the reliability of features extracted from a corresponding region in which the occlusion is present may be calculated to be relatively low. When a user wears sunglasses, the reliability of features extracted at locations of eyes may be calculated to be relatively low. In this example, an occlusion may be determined to be present at the locations of eyes.

When the occlusion is determined to be present in the normalized facial region, the image for authentication is generated in operation 1440. In operation 1440, image for authentication generating algorithms may be applied. In operation 1450, authentication is performed. In operation 1450, authentication performing algorithms may be applied.

FIG. 15 is a block diagram illustrating a configuration of an authentication apparatus according to at least one example embodiment. Referring to FIG. 15, the authentication apparatus 1500 includes a preprocessor 1510, a determiner 1520, a generator 1530, an authenticator 1540, and a storage 1550 (i.e., computer-readable media). Each of the preprocessor 1510, the determiner 1520, the generator 1530, and the authenticator 1540 may be configured as a processing device executing software, hardware circuits, or a combination of the processing device executing software and hardware circuits.

The preprocessor 1510 may receive an input image, may detect a facial region from the input image, and may normalize the detected facial region. Depending on cases, the preprocessor 1510 may normalize the input image and then detect the facial region.

The determiner 1520 may determine whether an occlusion is present in the normalized facial region. For example, the determiner 1520 may extract feature points from the normalized facial region. When feature points corresponding to a primary configuration such as an eye, a nose, lips, and an eyebrow are not detected, the determiner 1520 may determine that the corresponding configuration is occluded.

When the occlusion is determined to be present in the normalized facial region, the generator 1530 may generate an image for authentication. The generator 1530 may select images suitable for representing the input image from among authenticated images and/or images of another user stored in an image database 1560, and may generate the image for authentication by combining the selected images.

The authenticator 1540 may perform authentication using the image for authentication. The authenticator 1540 may compare the image for authentication and a registered image 1570. The authenticator 1540 may also compare the image for authentication and the input image. When the occlusion is determined to be absent in the normalized facial region, the authenticator 1540 may compare the input image and the registered image 1570.

The storage 1550 may continuously update the image database 1560. When the occlusion is determined to be absent in the normalized facial region, the storage 1550 may store the input image or the normalized facial region in the image database 1560. When the authentication is a success, the storage 1550 may store the input image or the normalized facial region as an authenticated image. Conversely, when the authentication is a failure, the storage 1550 may store the input image or the normalized facial region as an image of another user.

FIG. 16 is a block diagram illustrating an electronic system according to at least one example embodiment. Referring to FIG. 16, the electronic system includes an image sensor 1610, an image signal processor (ISP) 1620, a memory 1630, and a display 1640. The image sensor 1610, the ISP 1620, the memory 1630, and the display 1640 may communicate with one another through a bus 1650.

The image sensor 1610 may generate image data by capturing an image. For example, the image sensor 1610 may generate image data by converting optical information to an electronic signal. The image data is output to the ISP 1620.

The ISP 1620 may perform the functions of the authentication apparatus 110 and the authentication apparatus 1500 by executing instructions stored by the memory 1630. Thus, by executing the instructions stored by the memory 1630, the ISP 160 becomes a special purpose computing device that performs a face authentication operation (or a facial recognition operation, or a user authentication operation) described above with reference to FIGS. 1 through 15. The ISP 1620 may include one or more processing devices such as Central Processing Units (CPUs), digital signal processors (DSPs), application-specific-integrated-circuits, field programmable gate arrays (FPGAs) computers or the like. The ISP 1620 may include a face authentication circuit (or a facial recognition circuit, or a user authentication circuit) configured to perform a face authentication operation (or a facial recognition operation, or a user authentication operation) described above with reference to FIGS. 1 through 15.

The memory 1630 may store image data generated by the image sensor 1610, or may store various types of data generated by the ISP 1620. The memory 1630 may be a volatile memory or a non-volatile memory. The display 1640 may display a variety of user interfaces for the aforementioned face authentication operation (or a facial recognition operation, or a user authentication operation). The ISP 1620 may execute a program stored in the memory 1630 and may control the electronic system. A program code executed by the ISP 1620 may be stored in the memory 1630.

The electronic system may be connected to an external device such as a personal computer or a network through an input/output (I/O) device. The electronic system may exchange data with the external device. The electronic system may be embedded in an electronic device, for example, a mobile device such as a mobile phone, a smartphone, a personal digital assistant (PDA), a tablet computer, and a laptop computer; a computing device such as a personal computer, a tablet computer, and a net book; and a security device for controlling a TV, a smart TV, and a gate.

The units and/or modules (e.g., the selector 111, the generator 112, the authenticator 113, the preprocessor 1510, the determiner 1520, the generator 1530 and the authenticator 1540) described herein may be implemented using hardware components and/or a processing device software components. For example, the hardware components may include microphones, amplifiers, band-pass filters, audio to digital convertors, and processing devices. A processing device may be implemented using one or more hardware device configured to carry out and/or execute program code by performing arithmetical, logical, and input/output operations. The processing device(s) may include a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An authentication method comprising:
receiving an input image, the input image including an object;
selecting at least one of a plurality of authenticated images based on the input image;
generating an image for authentication based on the selected at least one authenticated image; and
performing authentication of the object based on the image for authentication.

2. The method of claim 1, wherein the input image comprises a partially occluded face.

3. The method of claim 1, wherein the selecting comprises:
determining weights of the plurality of authenticated images, respectively, based on a first element associated with a similarity between the input image and the respective authenticated image and a second element associated with a number of the selected at least one authenticated images.

4. The method of claim 3, wherein the selecting further comprises:
determining weights of unselected authenticated images of the plurality of authenticated images as "0".

5. The method of claim 1, wherein the selecting comprises:
determining weights of the authenticated images based on the following equation $$\hat{x} = \arg\min_{x}\{\|y - Dx\|_2^2 + \lambda\|x\|_1\}$$

where y denotes the input image, D denotes the plurality of authenticated images, λ denotes a scalar coefficient, and $\hat{x}$ denotes the weights of the plurality of authenticated images.

6. The method of claim 1, wherein the generating comprises:
calculating a weighted summation of feature values of the plurality of authenticated images based on weights of the authenticated images.

7. The method of claim 1, wherein the performing the authentication comprises at least one of:
generating a first result based on a registered image and the image for authentication; and
generating a second result based on the input image and the image for authentication.

8. The method of claim 7, wherein the performing the authentication further comprises:
determining the authentication of the input image based on at least one of the first result and the second result.

9. The method of claim 1, further comprising:
detecting a facial region from the input image; and
determining a presence of an occlusion region in the facial region.

10. The method of claim 9, wherein the selecting selects the at least one of the plurality of authenticated images based on the determining the presence of the occlusion region in the facial region.

11. The method of claim 9, further comprising:
comparing the input image and a registered image based on the determining the presence of the occlusion region in the facial region.

12. The method of claim 11, further comprising:
storing the input image as an authenticated image of the plurality of authenticated images in response to a success in the authentication.

13. A non-transitory computer readable medium including a program that, when executed by a processor, configured to cause the process to perform the method of claim 1.

14. An authentication apparatus comprising:
- a memory configured to store computer-readable instructions; and
- at least one processor configured to execute the computer-readable instructions such that the at least one processor is configured to,
  - generate an image for authentication corresponding to an input image of a user using at least a portion of images from among images of another user and authenticated images stored in a database, the input image including a face of the user, and
  - authenticate the user based on the image for authentication.

15. The authentication apparatus of claim 14, wherein the face of the user is partially occluded.

16. The authentication apparatus of claim 14,
- wherein the at least one processor is configured to execute the computer-readable instructions to select the at least a portion of images based on a first element and a second element, the first element being associated with a similarity between the input image and images of another user and authenticated images stored and the second element being associated with the number of the at least a portion of images.

17. The authentication apparatus of claim 16, wherein the at least one processor is configured to execute the computer-readable instructions to determine weights of remaining images excluding the at least a portion of images as "0".

18. The authentication apparatus of claim 16, wherein the at least one processor is configured to execute the computer-readable instructions to select the at least a portion of images based on the following equation, $$\hat{x} = \arg \min_{x} \{\|y - Dx\|_2^2 + \lambda \|x\|_1\}$$

where y denotes the input image, D denotes the authenticated images and the images of another user, $\lambda$ denotes a scalar coefficient, and $\hat{x}$ denotes weights of the authenticated images and the images of another user.

19. The authentication apparatus of claim 14, wherein the at least one processor is configured to execute the computer-readable instructions to calculate a weighted summation of feature values of selected authenticated images of another user to generate the image for authentication.

20. The authentication apparatus of claim 14, wherein the at least one processor is configured to execute the computer-readable instructions to authenticate the user based on at least one of a similarity between a registered image and the image for authentication and a restoration error between the input image and the image for authentication.

21. The authentication apparatus of claim 14, wherein the at least one processor is configured to execute the computer-readable instructions to authenticate the user based on whether the images of another user are in the at least a portion of images.

22. The authentication apparatus of claim 14, wherein the at least one processor is configured to execute the computer-readable instructions to obtain information regarding detection of a facial region from the input image and a presence of an occlusion region in the facial region.

23. The authentication apparatus of claim 22, the at least one processor is configured to execute the computer-readable instructions to generate the image for authentication based on the presence of the occlusion region in the facial region.

24. The authentication apparatus of claim 22, wherein the at least one processor is configured to execute the computer-readable instructions to authenticate the user based on the input image and a registered image based on an absence of the occlusion region.

25. The authentication apparatus of claim 24,
- wherein the at least one processor is configured to execute the computer-readable instructions to store the input image in the database as an additional image for authentication in response to a success in authenticating the user, and to store the input image in the database as an additional image of another user in response to a failure in authenticating the user.

26. The authentication apparatus of claim 14, wherein the processor is configured to execute the computer-readable instructions to,
- determine a first number based on the image for authentication and a registered image,
- determine a second number based on the image for authentication and the input image, and
- authenticate the user based on the first number and the second number.

27. The authentication apparatus of claim 26, wherein the first number corresponds to a similarity between the image for authentication and the registered image and the second number corresponds to a restoration error between the image for authentication and the input image.

* * * * *